(12) United States Patent
Hood et al.

(10) Patent No.: US 8,177,053 B2
(45) Date of Patent: May 15, 2012

(54) AIR CUSHION CONVEYOR STACKER RECLAIMER DEVICE AND METHOD THEREOF

(76) Inventors: Kevin Hood, Lawrenceville, GA (US);
Bengt Nilsson, Alpharetta, GA (US);
Steven Bennett, Alpharetta, GA (US)

( * ) Notice: Subject to any disclaimer, the term of this patent is extended or adjusted under 35 U.S.C. 154(b) by 732 days.

(21) Appl. No.: 11/991,396

(22) PCT Filed: Aug. 29, 2006

(86) PCT No.: PCT/US2006/033729
§ 371 (c)(1),
(2), (4) Date: Jun. 11, 2008

(87) PCT Pub. No.: WO2007/027696
PCT Pub. Date: Mar. 8, 2007

(65) Prior Publication Data
US 2008/0302635 A1   Dec. 11, 2008

Related U.S. Application Data

(60) Provisional application No. 60/712,325, filed on Aug. 29, 2005.

(51) Int. Cl.
*B65G 23/18* (2006.01)

(52) U.S. Cl. ........ 198/811; 198/818; 198/508; 414/299; 414/302; 414/310; 414/326

(58) Field of Classification Search ................... 198/811, 198/818, 508; 414/299, 302, 310, 326
See application file for complete search history.

(56) References Cited

U.S. PATENT DOCUMENTS

| | | | | |
|---|---|---|---|---|
| 2,750,023 A * | 6/1956 | Meissner | ...................... | 198/508 |
| 3,075,657 A * | 1/1963 | Hazen | ........................... | 414/297 |
| 3,438,517 A * | 4/1969 | Steffen | ........................... | 414/295 |
| 3,456,818 A * | 7/1969 | Massey | ........................... | 414/302 |
| 3,487,961 A * | 1/1970 | Neuenschwander | .......... | 366/133 |
| 3,604,757 A * | 9/1971 | White | ............................. | 406/39 |
| 3,713,552 A * | 1/1973 | Schnyder | ...................... | 414/287 |
| 3,765,548 A * | 10/1973 | Shivvers | ....................... | 414/310 |
| 3,847,289 A | 11/1974 | Fischer | | |
| 4,121,724 A * | 10/1978 | Fischer | ......................... | 414/133 |
| 4,154,332 A | 5/1979 | Schlegel | | |
| 4,382,502 A * | 5/1983 | Beresinsky | ................ | 198/626.4 |
| 4,451,192 A * | 5/1984 | Wood | ............................ | 414/306 |
| 4,537,553 A * | 8/1985 | Andersson | .................... | 414/302 |
| 4,550,823 A * | 11/1985 | Gladish | ......................... | 198/805 |
| 4,631,125 A * | 12/1986 | Parks | ........................... | 209/215 |
| 4,824,312 A | 4/1989 | Schiltz | | |
| 4,998,855 A * | 3/1991 | Tschernatsch | ................ | 414/133 |
| 5,042,646 A * | 8/1991 | Beatty | ........................... | 198/819 |
| 5,727,918 A * | 3/1998 | Arend et al. | ............... | 414/140.4 |
| 5,860,510 A * | 1/1999 | Becker | .......................... | 198/819 |
| 6,021,889 A * | 2/2000 | Tingskog | ...................... | 198/812 |
| 6,095,742 A | 8/2000 | Campbell | | |
| 6,132,156 A * | 10/2000 | Shehata | ..................... | 414/140.9 |
| 6,170,644 B1 * | 1/2001 | Nakaegawa et al. | .......... | 198/811 |
| 6,966,430 B2 * | 11/2005 | Swinderman et al. | ........ | 198/811 |
| 7,101,140 B2 | 9/2006 | Jonkka | | |

* cited by examiner

*Primary Examiner* — Joseph A Dillon, Jr.

(57) ABSTRACT

An air cushion conveyor stacker reclaimer device and a method thereof, wherein burial of enclosed air cushion outfeed conveyors eliminates the need for costly, reinforced underground tunnels and walkways, wherein overhead suspension of air cushion infeed conveyors eliminates the need for construction of raised walkways and costly ground support structures, wherein lightweight air cushion conveyor stacker devices eliminate the need for massive counterweights, and wherein the fully exploited method for stacking and reclaiming bulk materials via enclosed tubular components, stacking boom curtains, and/or domed enclosures essentially eliminates adverse environmental impact.

6 Claims, 8 Drawing Sheets

PRIOR ART

FIGURE 8 ic cushion conveyor stacker reclaimer device and a method thereof, wherein air cushion conveyors facilitate cost-effective installation, minimize structural support requirements, reduce maintenance requirements, increase worker safety, and diminish potentially disadvantageous environmental impact from materials handling.

AIR CUSHION CONVEYOR STACKER RECLAIMER DEVICE AND METHOD THEREOF

CROSS-REFERENCE AND PRIORITY CLAIM TO RELATED APPLICATION

This United States Non-provisional patent application claims priority to and the benefit of, and is a National Phase entry of Patent Cooperation Treaty application PCT/US2006/033729, filed on Feb. 28, 2008, and entitled "Air Cushion Conveyor Stacker Reclaimer Device and Method Thereof," which claims priority to and the benefit of United States Provisional patent application entitled "Air Cushion Conveyor Stacker Reclaimer Device and Method Thereof," filed Aug. 29, 2005, on behalf of inventors Kevin Hood, Bengt Nilsson, and Steven Bennett, and having assigned Ser. No. 60/712,325.

TECHNICAL FIELD

The present invention relates generally to stacker/reclaimer devices and, more specifically, to an air cushion conveyor stacker reclaimer device and a method thereof, wherein air cushion conveyors facilitate cost-effective installation, minimize structural support requirements, reduce maintenance requirements, increase worker safety, and diminish potentially disadvantageous environmental impact from materials handling.

BACKGROUND OF THE INVENTION

Stacker/reclaimer devices are utilized for a variety of bulk material applications such as, for exemplary purposes only, stacking, blending and reclaiming limestone for the cement industry, crushed stone for aggregate processors, coal and/or ore for mining and power operations, general bulk materials for the marine industry, and urea, nitrate and phosphate for fertilizer applications. Automated stacking and reclaiming of stockpiles enables the realization of substantial reductions in operating costs, wherein power consumption, manpower requirements and maintenance costs are minimized.

The complexity of installation requirements, coupled with elaborate facility preparation typically necessary for traditional conveyor belt stacker reclaimers can economically inhibit the feasibility of incorporating such automated technology for some potential users. That is, lengthy infeed belt conveyors, with heavy idlers and machinery components require installation of numerous support structures, and walkways must be constructed coincident therewith in order to facilitate access for required maintenance. In addition to disadvantageous installation expense, the support structures require available, dedicated ground space, and the elevated walkways subject workers to potentially dangerous heights.

Likewise, traditional conveyor belt outfeed conveyors often necessitate sophisticated facility preparation, including installation of a large pit area with an elaborate foundation and an underground tunnel. The tunnel is required to enable workers to access the belt idler rollers and operational machinery for necessary ongoing maintenance in order to ensure continued functionality. Thus, because workers must move about in the tunnel, the tunnel construction must be substantially reinforced. Such tunnel requirements not only increase cost, but also disadvantageously place workers in a potentially dangerous underground position.

Further, weighty conveyor belt stacker boom configurations necessitate the incorporation of massive counterweights. These counterweights inherently limit the free space available proximate to the tail end of the stacker boom, potentially decreasing the mobility thereof and also potentially increasing safety risks to those working in close proximity thereto.

In addition to potentially disadvantageous safety and cost issues, traditional belt conveyors can also introduce environmental issues. For example, for certain bulk materials, pollutive dust can enter the air during conveyor transport. Noise can also be a disadvantageous factor, wherein machinery and rollers associated with conventional belt conveyors tend to be loud. Moreover, materials can spill over the sides of the conveyor support trough, resulting not only in unsightly environmental debris, but also in potentially costly product loss.

Therefore, it is readily apparent that there is a need for an air cushion conveyor stacker reclaimer device and a method thereof, wherein air cushion conveyors facilitate cost-effective installation, minimize structural support requirements, reduce maintenance requirements, increase worker safety, and diminish potentially disadvantageous environmental impact, thus preventing the above-discussed disadvantages.

BRIEF SUMMARY OF THE INVENTION

Briefly described, in a preferred embodiment, the present invention overcomes the above-mentioned disadvantages and meets the recognized need for such a device by providing an air cushion conveyor stacker reclaimer device and a method thereof, wherein burial of enclosed air cushion outfeed conveyors eliminates the need for costly, reinforced underground tunnels and walkways, wherein overhead suspension of air cushion infeed conveyors eliminates the need for construction of raised walkways and costly ground support structures, wherein lightweight air cushion conveyor stacker devices eliminate the need for massive counterweights, and wherein the fully exploited method for stacking and reclaiming bulk materials via enclosed tubular components, stacking boom curtains, and/or domed enclosures essentially eliminates adverse environmental impact.

According to its major aspects and broadly stated, the present invention is an air cushion conveyor stacker reclaimer device and a method thereof, wherein traditional belt conveyors, idler rollers and the machinery associated therewith are replaced with totally enclosed tubes housing air supported belts, and wherein movement is generated by air flow from external ventilators, thereby eliminating the need for conveyor access, both above ground and below, thus simplifying installation, operation, and maintenance procedures.

More specifically, the present invention is a cost-effective method of installation of a stacker reclaimer, and of automated stacking and reclaiming wherein materials are transported via an enclosed tubular air cushion infeed conveyor supported by overhead suspension, wherein the nature of the tubular air cushion conveyor enables a maximization of the possible span of the infeed between the bulk material and the tower. The bulk materials are transferred, via the central tower, to an enclosed tubular air cushion conveyor stacker device, wherein the nature of the tubular air cushion conveyor enables a minimization of necessary counterweight. The stacked materials are subsequently reclaimed off of the top of the pile via a rake reclaim system or pushed by a harrow for reclaiming and/or raking into a transfer chute in the pit, wherein the pit foundation is constructed to enable worker access to slew drive machinery and other necessary functional components about the central axis of the foundation, proximate the base of the tower, but an enclosed tubular air cushion outfeed conveyor is buried and, other than the portion below the tower, is otherwise inaccessible. This enclosed burial of the outfeed conveyor dramatically reduces installation complexity and costs over previously known stacker/reclaimer methodologies, wherein no tunnel construction is required, resulting additionally in reduced risk to operators and maintenance personnel by alleviating the need to work in underground tunnels and the risks attendant thereto.

Therefore, a feature and advantage of the present invention is the ability of such a method and device to eliminate the necessity for construction of an outfeed worker access tunnel, thereby reducing installation costs.

Another feature and advantage of the present invention is the ability of such a method and device to maximize overall efficiency via decreased installation and operational costs.

Another feature and advantage of the present invention is the ability of such a method and device to increase the potential span of the infeed, thereby providing for more site flexibility.

Another feature and advantage of the present invention is the ability of such a method and device to increase the potential diameter of stacker reach, while decreasing the need for counterweight.

Another feature and advantage of the present invention is the ability of such a method and device to minimize installation costs by eliminating the need for extensive above and below ground walkways.

Another feature and advantage of the present invention is the ability of such a method and device to minimize operational costs by eliminating the necessity for traditional belt conveyors, thus decreasing power consumption, wear, maintenance and overall installation and operating costs.

Another feature and advantage of the present invention is the ability of such a method and device to enable efficient, essentially enclosed, environmentally friendly stacking and reclaiming of bulk materials.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATE EMBODIMENTS

This United States Non-provisional patent application claims priority to and the benefit of, and is a National Phase entry of Patent Cooperation Treaty application PCT/US2006/033729, filed on Feb. 28, 2008, and entitled "Air Cushion Conveyor Stacker Reclaimer Device and Method Thereof," which claims priority to and the benefit of United States Provisional patent application entitled "Air Cushion Conveyor Stacker Reclaimer Device and Method Thereof," filed Aug. 29, 2005, on behalf of inventors Kevin Hood, Bengt Nilsson, and Steven Bennett, and having assigned Ser. No. 60/712,325.

In describing the preferred and alternate embodiments of the present invention, as illustrated in the figures and/or described herein, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
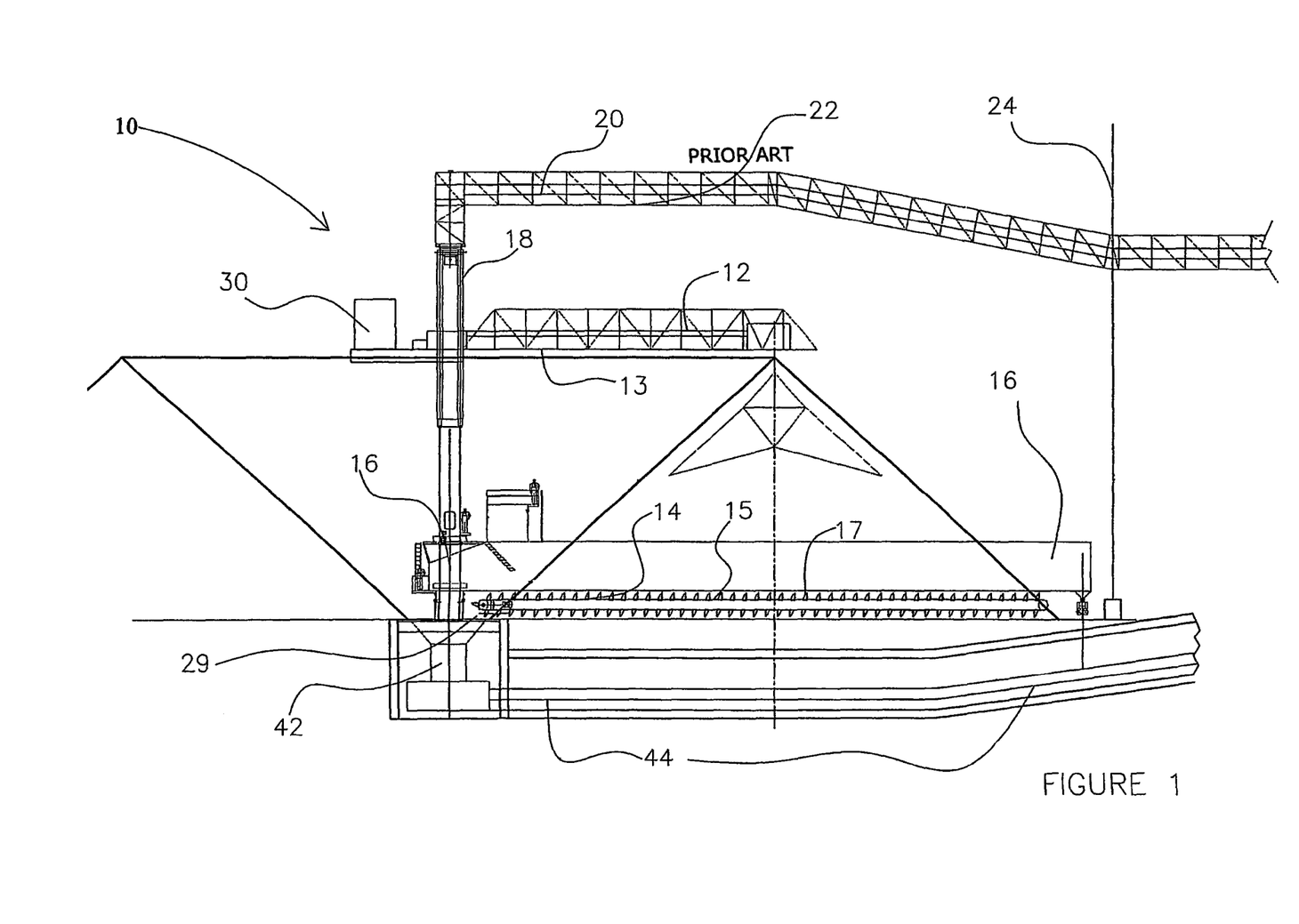
FIG. 1 is a perspective view of a prior art stacker reclaimer apparatus, showing an exemplary ground-based infeed support structure and exemplary counterweights.

To better understand the present system and method of this invention, a rudimentary knowledge of a typical prior-art stacker reclaimer and process is helpful. Referring first to FIG. 1, a conventional stacker reclaimer 10 is shown, wherein stacker boom 12 with walkway 13 is supported by upper tower 18, reclaimer assembly 14 is supported by main frame 16, and infeed conveyor 20 with walkway 22 is supported by plurality of ground supports 24 and tower 18. Materials are deposited in a pile via stacker boom 12 following receipt from infeed conveyor 20, wherein the traditional system configuration allows independent rotation of stacker boom 12 and reclaimer assembly 14 about a central axis, and wherein reclaimer chain 15 enables movement of the plurality of rakes 17 to reclaim bulk material from a pile. A transfer chute (not shown) is typically positioned to receive loose bulk materials from reclaimer conveyor 29 through an exit chute onto conventional outfeed conveyor 44.

The infeed, stacker, outfeed and other conveyor members of such a traditional configuration rely upon machine driven belts rolling on idlers for transport of bulk materials. The tremendous weight of the traditional belt conveyor system necessitates the reliance upon huge counterweights 30, 32 for boom balance and frequently spaced structural support towers 24 for elevated conveyor positioning. Further, the mechanical components for these belt conveyors require frequent maintenance and the conveyors must be fully accessible, hence the need for coincident construction of associated walkways. In the case of typical infeed conveyors, these walkways are substantially elevated, and the structural support requirements are often elaborate. Likewise, traditional conveyor belt outfeed conveyors often necessitate sophisticated facility preparation, including an underground tunnel to enable worker access.

Figure 2:
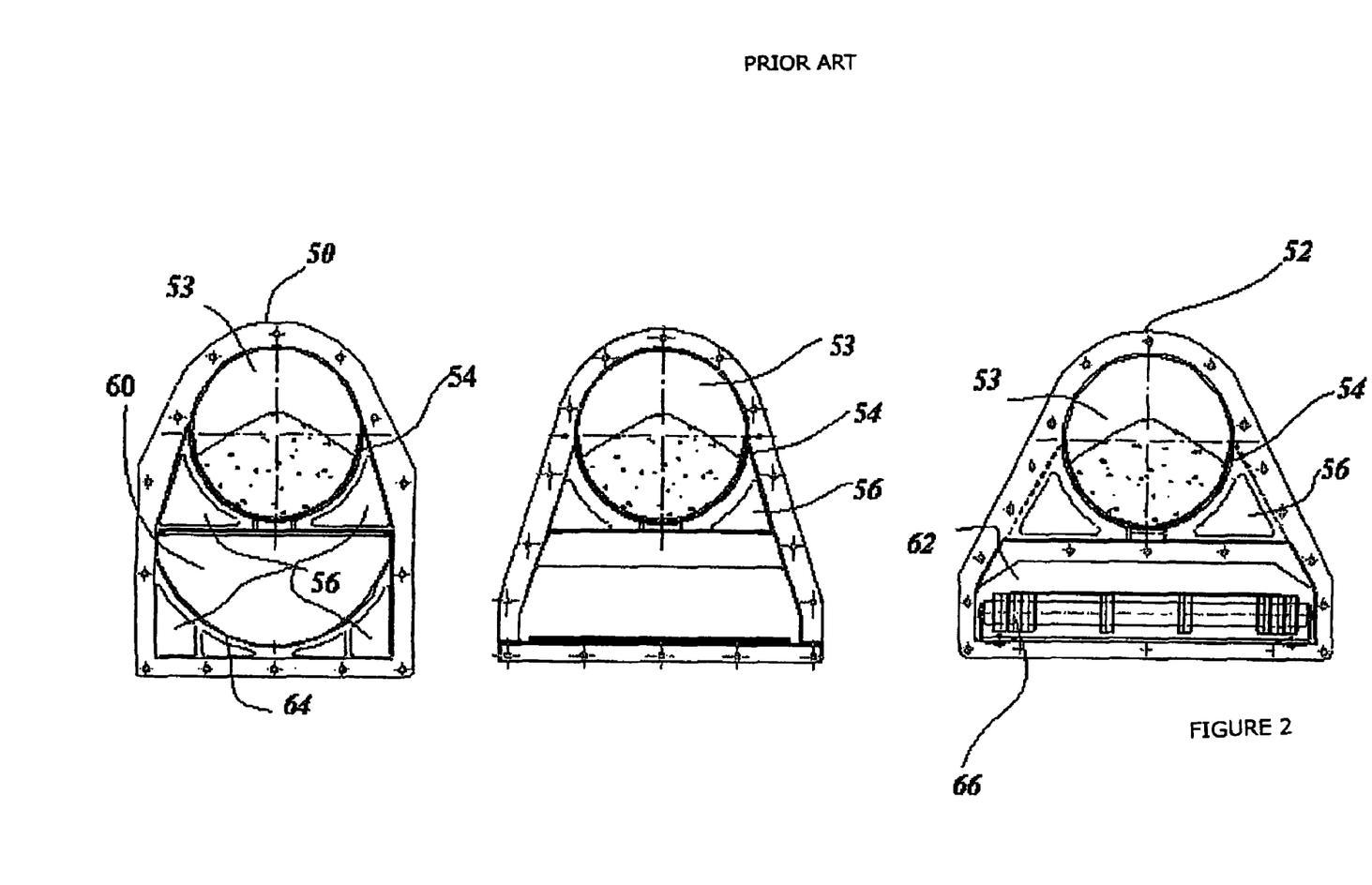
FIG. 2 is a cross-sectional view of prior art air cushion conveyor tubes, showing two types of belt returns.

To further facilitate a better understanding of the present system and method of this invention, knowledge of a typical air cushion conveyor structure is also helpful. Referring now to FIG. 2, two types of air cushion conveyor structures are shown. Each air cushion conveyor 50 and 52 is essentially an elongated cylindrical tube, defining and enclosing interior compartment 53 with conveyor belt 54 therein. The enclosed nature of air cushion conveyors 50 and 52 enhances the load conveying capacity thereof. Air channels 56 are defined proximate interior compartment 53, wherein conveyor belt 54 rests on a cushion of air supplied by external, low powered ventilators 58. Bulk materials travel on conveyor belt 54 via air flow influence, interacting with simple cable and pulley components (not shown), wherein the nature of continuous conveyor belt 54 results in a return compartment 60 and 62 in which the returning conveyor belt 54 moves via air slide 64 or return idlers 66, respectively.

Figure 3:
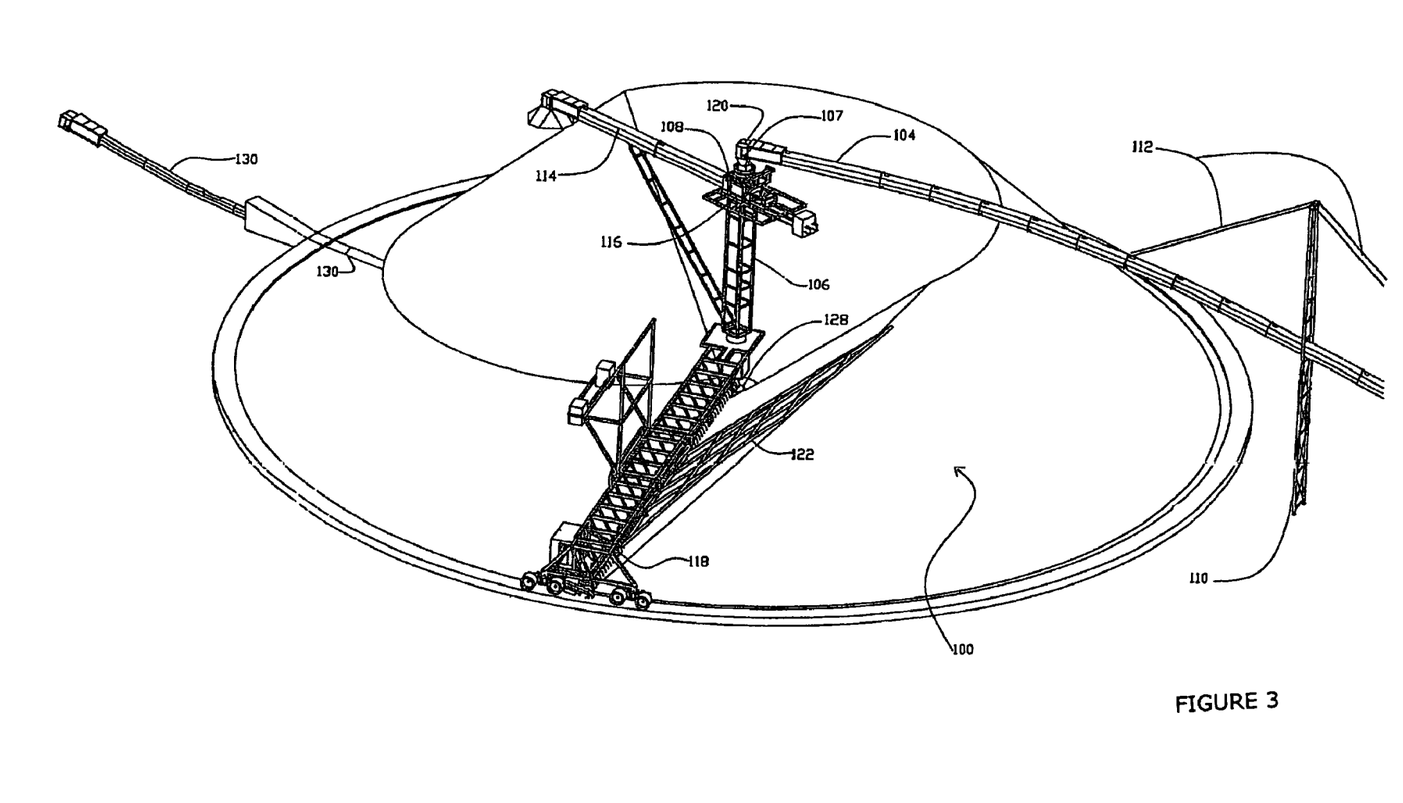
FIG. 3 is an overhead perspective view of an air cushion conveyor stacker reclaimer apparatus, according to the preferred embodiment of the present invention.

Referring now to FIG. 3, according to the preferred method of the present invention for installation of a stacker reclaimer apparatus, whereby the preferred embodiment of the present invention, air cushion conveyor stacker reclaimer device 100 is installed, in order to practice the preferred method of stacking reclaiming, plurality of modular sections 102 are preferably positioned, end to end, in an arrangement extending preferably from a bulk material source to a reclaimer pile, wherein plurality of modular sections 102 are adapted to be secured together to define preferred air cushion conveyor infeed 104.

Figure 5:
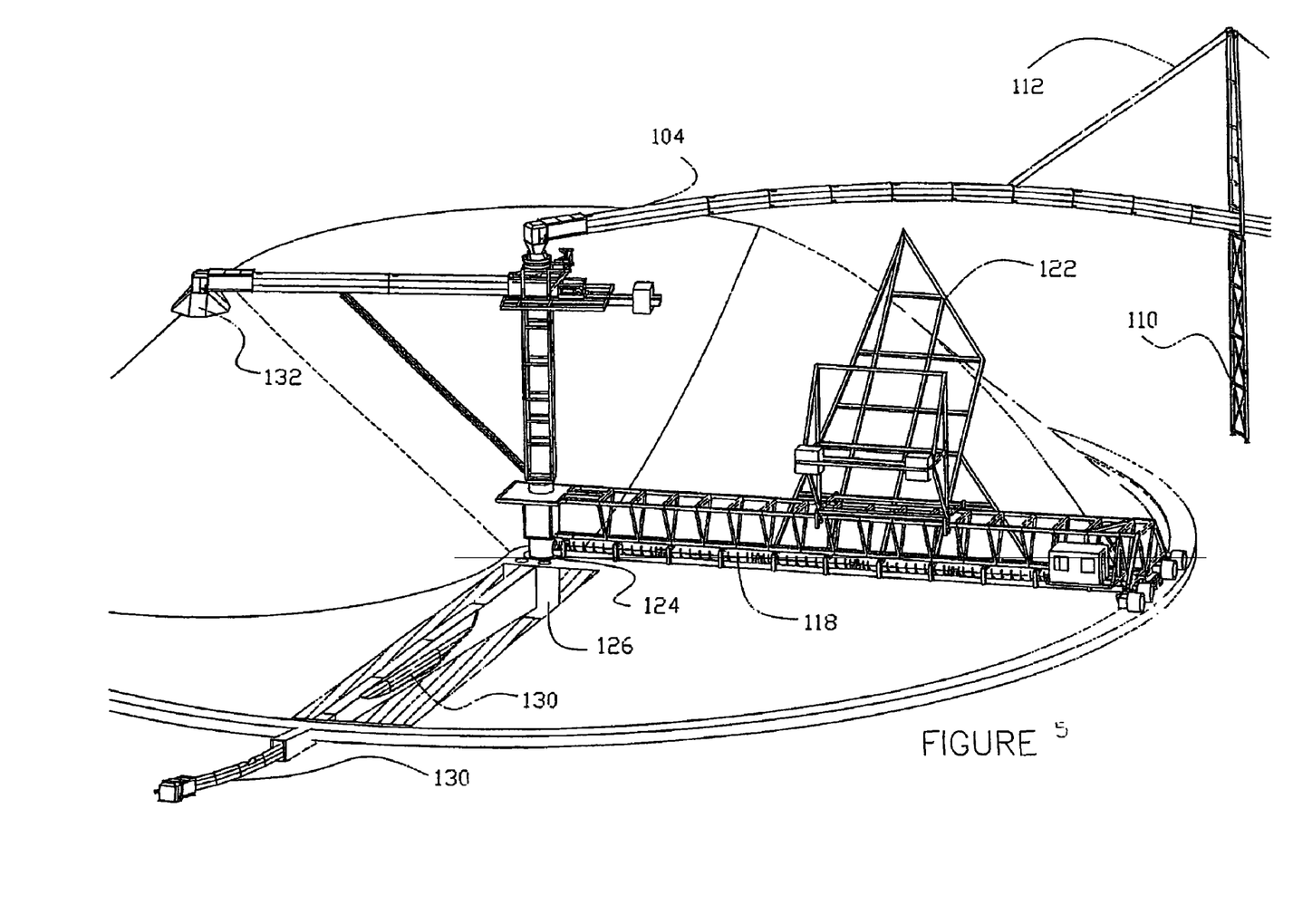
FIG. 5 is a partial cut-away perspective view of the air cushion conveyor stacker reclaimer apparatus of FIG. 3, showing the buried outfeed air cushion conveyor.

Preferably, central tower 106 is constructed with first end 107 of air cushion conveyor infeed 104 supported proximate upper tower 108. Second end of air cushion conveyor infeed 104 is preferably positioned proximate a source of bulk materials, wherein the preferred length of air cushion conveyor infeed 104 is between 60 to 1300 feet. Preferably, ground support towers 110, depicted in FIG. 5, are positioned at intervals spanning 75 to 250 feet, wherein plurality of suspension wires 112 angularly extend therefrom, supporting portions of air cushion conveyor infeed 104 from above. Preferably, the inclusion of support towers 110, preferably steel, facilitates secure installation of air cushion conveyor infeed 104 at heights up to and exceeding 90 feet above ground level, wherein preferred spans of up to 225 feet can exist between suspension wires 112, also referred to as cable supports.

The foregoing preferred method of installation for preferred air cushion conveyor infeed 104 may be altered to accommodate more or less frequently spaced ground support towers 110 and/or more or less frequently placed suspension wires 112; however, the preferred configuration, as described, maximizes support while minimizing required groundspace construction, wherein the preferred configuration of air cushion conveyor infeed 104 is self-supporting in lengths up to 75 feet. Additionally, although it is possible that air cushion conveyor infeed 104 could be shorter than 60 feet or longer than 1300 feet, such preferred length range best facilitates effective and efficient operation thereof.

Central tower 106 preferably supports preferred air cushion conveyor stacker device 114 proximate tower midsection 116, as shown in FIG. 3, wherein bulk materials are preferably deposited in a pile via air cushion stacker device 114 following receipt from preferred air cushion conveyor infeed 104, wherein the preferred installation and resulting system configuration of the present invention allows independent rotation of air cushion conveyor stacker device 114 and reclaimer assembly 118 about central tower axis 120, wherein the absence of massive counterweights facilitates maximization of rotational clearance about air cushion conveyor stacker device 114 and reclaimer assembly 118 relative to central tower axis 120. One skilled in the art will recognize that although air cushion conveyor stacker device 114 is depicted as a stacker boom, other types of stackers known in the art may alternately be utilized.

Figure 4:
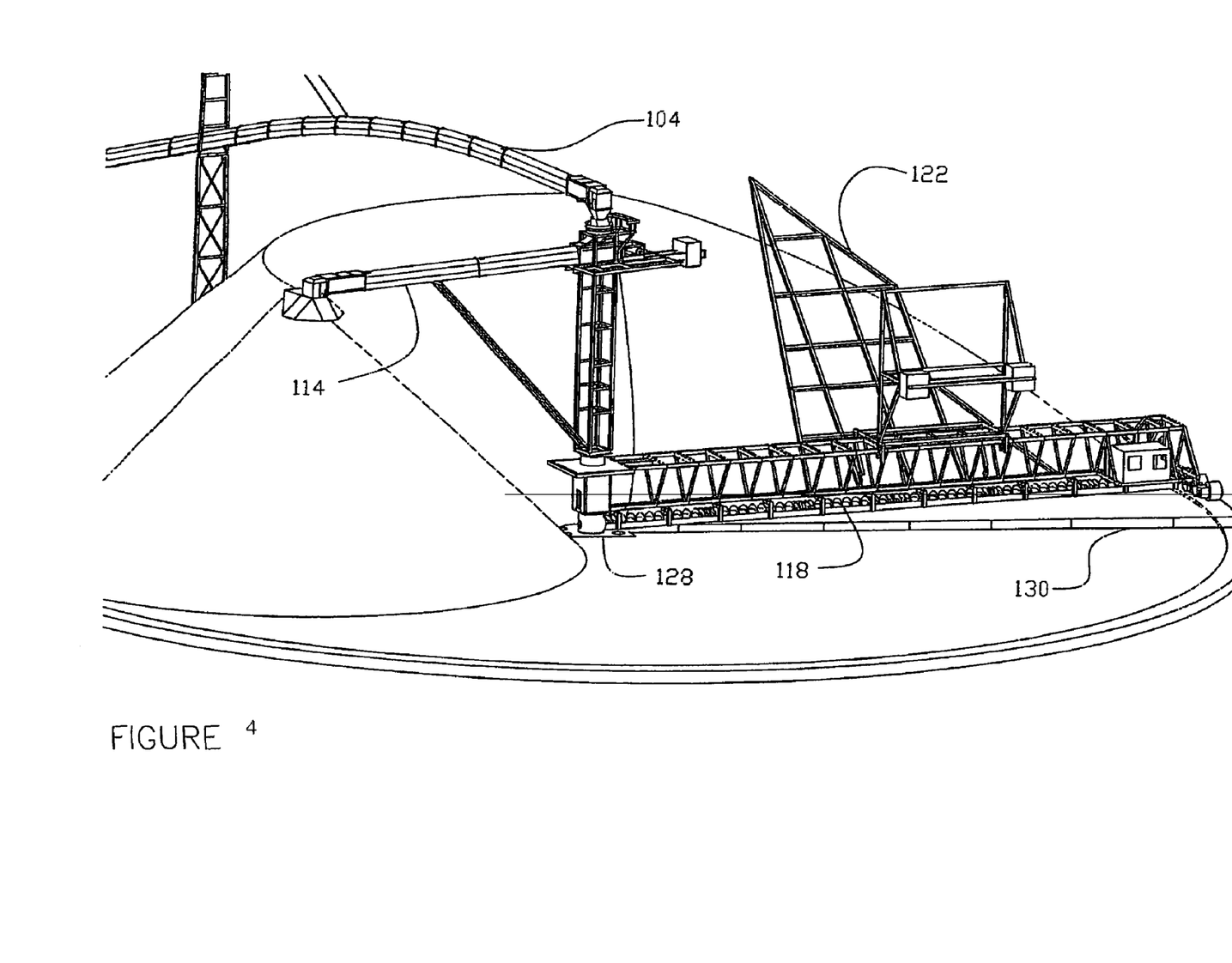
FIG. 4 is a second side perspective view of the air cushion conveyor stacker reclaimer apparatus of FIG. 3.

Preferably, harrow 122 extends upwardly and angularly away from reclaimer assembly 118, as shown in FIGS. 2-4, in contact with the face of the pile of bulk materials, wherein the preferred positioning enables pushing and/or raking of materials into a transfer chute (not shown) in pit 124, wherein pit foundation 126 is constructed to enable worker access to slew drive machinery and other necessary functional components about central axis 120 of pit foundation 126, proximate base 128 of central tower 106, as depicted in FIG. 5. It is recognized that other types of reclaimer assemblies could be incorporated in lieu of preferred, generally covered reclaimer assembly 118 with harrow 122.

Figure 6:
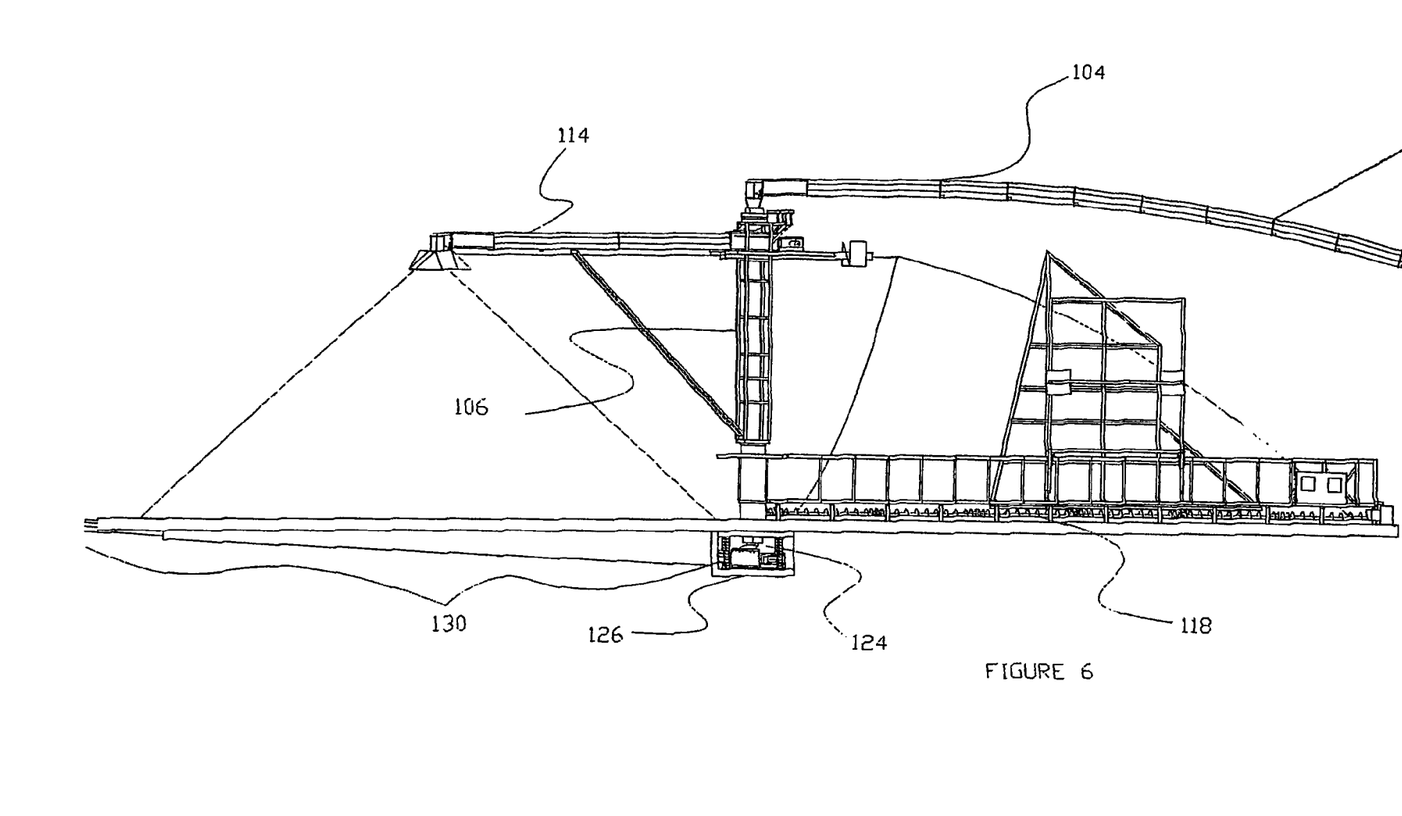
FIG. 6 is a cross-sectional schematic view of the air cushion conveyor stacker reclaimer apparatus of FIG. 3.
Figure 7:
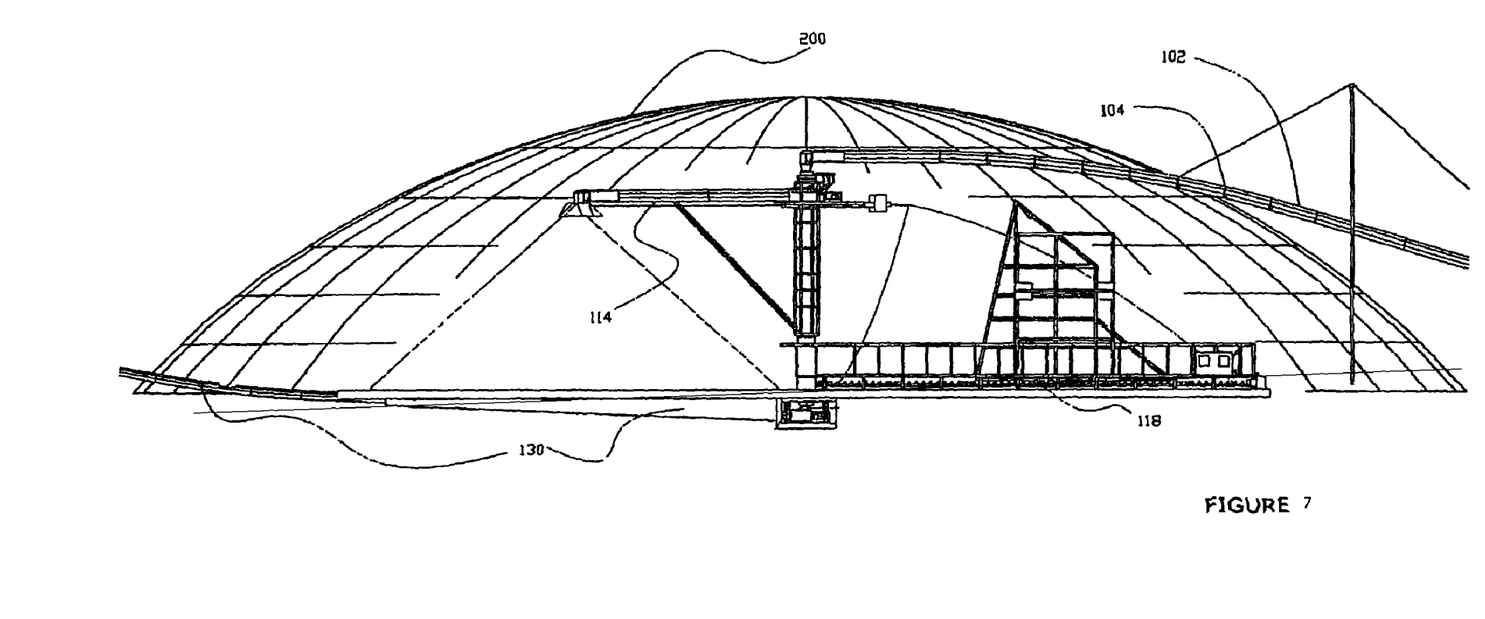
FIG. 7 is a cross-sectional view of an air cushion conveyor stacker reclaimer apparatus according to an alternate embodiment of the present invention, showing a dome-enclosed air cushion conveyor stacker reclaimer.

Referring to FIGS. 6-7, in the preferred configuration, reclaimed bulk materials are passed to preferred, enclosed tubular air cushion conveyor outfeed 130 for subsequent transfer. According to the preferred method of installation, the selected installation site is prepared by digging of a trench suitable for receiving tubular air cushion conveyor outfeed 130 therein. Preferably, plurality of modular sections 102 are positioned, end to end, in an arrangement extending preferably from pit foundation 126 to a selected bulk material delivery endpoint, silo, and/or any other type of storage and/or transfer depot. Prior to burial, plurality of modular sections 102 are secured together to define preferred air cushion conveyor outfeed 130. According to the preferred method of installation, no excess space is defined around air cushion conveyor outfeed 130, that is, no access tunnel is provided. Access to air cushion conveyor outfeed 130 is preferably available proximate pit foundation 126, but is not necessary therebeyond as the nature of preferred, enclosed air cushion conveyor outfeed 130, with few mechanical parts, requires minimal maintenance.

Thus, complexity and cost of installation is dramatically lowered according to the preferred method of installation of the present invention relative to that of previously known stacker reclaimer configurations, requiring underground tunnels and aerial walkways. Further, the subsequent operating costs are dramatically lowered according to the preferred method of stacking and reclaiming of the present invention, wherein fewer moving parts necessitate less power consumption and require minimal maintenance.

Additionally, the overall enclosed nature of preferred air cushion conveyor stacker reclaimer 100 enhances environmental compatibility. For example, the full utilization of enclosed tubular components reduces operational noise levels and power consumption, along with dusting and spillage frequently associated with the transport of bulk materials via traditional conveyors.

Further, in an alternate embodiment, air cushion conveyor stacker 114 could be adapted with skirt 132, as depicted in FIG. 5, wherein the escape of bulk materials into the environment could be significantly diminished, or even eliminated.

In another alternate embodiment, as depicted in FIG. 7, air cushion conveyor stacker reclaimer apparatus 100 could be enclosed within dome silo 200 for maximized environmental protection, such as for handling of potentially hazardous bulk materials.

To accommodate alternately shaped piles, other known tower, reclaimer, stacker and/or boom configurations could be utilized, wherein the improvement further described herein could be incorporated therewith. For example, more than one air cushion conveyor stacker could be utilized for multiple piles. Also, to reclaim materials from the side, a luffing boom scraper, a portal style reclaimer, a semi-portal reclaimer or a cantilever style reclaimer could be utilized, with a bridge type reclaimer enabling the reclaim of materials from the end face of a pile. Thus, whether circular or linear, whether provided with one chain or a plurality of chains or rake attachments, and irrespective of the facility and application style specifications, any known or anticipated reclaimer assembly may effectively incorporate the invention and improvement described herein.

Figure 8:
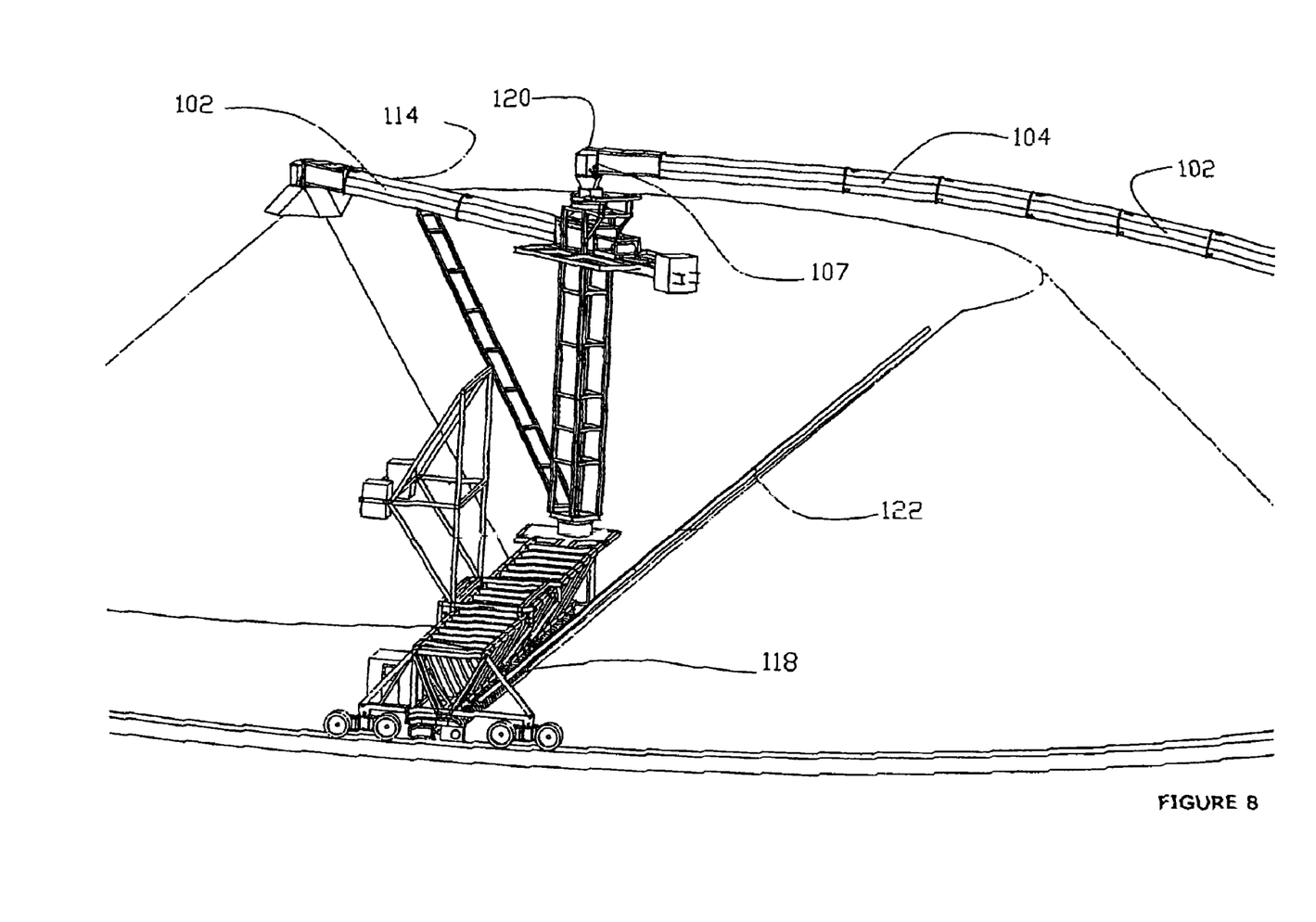
FIG. 8 is a partial cut-away perspective view of an air cushion conveyor stacker reclaimer apparatus according to an alternate embodiment of the present invention, showing the outfeed air cushion conveyor positioned within a trench.

In still another alternate embodiment, referring to FIG. 8, air cushion conveyor outfeed 130 could be enclosed within a pipe, concrete trench, or other barrier under the ground, wherein the need to construct a true tunnel could remain alleviated, but structural protection could be provided underground, external to the air cushion conveyor outfeed 130.

In yet still another alternate embodiment, air cushion conveyor infeed 104, air cushion conveyor stacker device 114, and/or air cushion conveyor outfeed 130 could incorporate slider belts in lieu of, or in addition to, air cushion conveyors for transport of materials with minimal mechanical requirements.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An air cushion conveyor stacker reclaimer device, comprising:
    an outfeed conveyor for conveying workpiece bulk materials;
    a reclaimer device for reclaiming the bulk materials;
    a stacking conveyor device for stacking the bulk materials;
    a main tower; and
    an air cushion infeed conveyor for conveying the bulk materials, said air cushion infeed conveyor having an enclosed interior compartment housing an air supported conveyor belt, and said air cushion infeed conveyor suspended above ground by a plurality of suspension wires extending from a fixed position above said air cushion infeed conveyor to said air cushion infeed conveyor.

2. The air cushion conveyor stacker reclaimer device of claim 1, wherein said outfeed conveyor is an air cushion outfeed conveyor having an enclosed interior compartment housing an air supported conveyor belt.

3. The air cushion conveyor stacker reclaimer device of claim 2, wherein said air cushion outfeed conveyor is positioned underground, circumferentially surrounded with and abutting earthen materials.

4. The air cushion conveyor stacker reclaimer device of claim 1, wherein said stacking conveyor device is an air cushion stacking conveyor having an enclosed interior compartment housing an air supported conveyor belt, said air cushion stacking conveyor balanced without a counterweight.

5. The air cushion conveyor stacker reclaimer device of claim 4, further comprising a stacking boom curtain.

6. The air cushion conveyor stacker reclaimer device of claim 1, wherein further comprising a domed enclosure, wherein said air cushion conveyor stacker reclaimer device resides substantially thereunder.

* * * * *